(12) United States Patent
Hara et al.

(10) Patent No.: US 8,084,144 B2
(45) Date of Patent: Dec. 27, 2011

(54) HIGH STRENGTH THICK WELDED STEEL PIPE FOR LINE PIPE SUPERIOR IN LOW TEMPERATURE TOUGHNESS AND METHOD OF PRODUCTION OF THE SAME

(75) Inventors: Takuya Hara, Tokyo (JP); Hitoshi Asahi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 393 days.

(21) Appl. No.: 12/312,879

(22) PCT Filed: Dec. 4, 2007

(86) PCT No.: PCT/JP2007/073740
§ 371 (c)(1),
(2), (4) Date: May 29, 2009

(87) PCT Pub. No.: WO2008/069335
PCT Pub. Date: Jun. 12, 2008

(65) Prior Publication Data
US 2010/0003535 A1      Jan. 7, 2010

(30) Foreign Application Priority Data

Dec. 4, 2006  (JP) ................................. 2006-327099
Nov. 29, 2007  (JP) ................................. 2007-309477

(51) Int. Cl.
*B32B 15/18* (2006.01)
*C22C 38/00* (2006.01)
*B21C 37/08* (2006.01)

(52) U.S. Cl. ........ 428/683; 428/586; 428/684; 428/682; 428/638; 138/142; 138/171; 148/521; 148/547; 148/330; 148/332; 148/333; 148/334; 148/335; 148/336; 228/173.4; 228/144

(58) Field of Classification Search .................. None
See application file for complete search history.

(56) References Cited

U.S. PATENT DOCUMENTS 7,879,287 B2 *   2/2011   Kobayashi et al. ............. 420/84
(Continued)

FOREIGN PATENT DOCUMENTS

EP            0 757 113            2/1997
(Continued)

OTHER PUBLICATIONS

International Search Report dated Mar. 18, 2008 issued in corresponding PCT Application No. PCT/JP2007/073740.
(Continued)

*Primary Examiner* — Aaron Austin
(74) *Attorney, Agent, or Firm* — Kenyon & Kenyon LLP

(57) ABSTRACT

The present invention provides high strength thick welded steel pipe for line pipe superior in low temperature toughness, and a method of production of the same. A base material steel plate containing C: 0.010 to 0.050%, Si: 0.01 to 0.50%, Mn: 0.50 to 2.00%, Al: 0.020% or less, Ti: 0.003 to 0.030%, and Mo: 0.10 to 1.50%, having a carbon equivalent Ceq of 0.30 to 0.53, having a crack susceptability parameter Pcm of 0.10 to 0.20, satisfying formula 3, comprised an area ratio of 20% or less of polygonal ferrite and an area ratio of 80% or more of bainite, and having an effective crystal grain size of 20 μm or less is formed into a pipe shape, then seam welded to make the effective crystal grain size of the heat affected zone 150 μm or less:

$$10C+100Al+5Mo+5Ni<3.3 \qquad \text{formula 3.}$$

16 Claims, 1 Drawing Sheet

U.S. PATENT DOCUMENTS

| | | | |
|---|---|---|---|
| 2003/0121577 A1* | 7/2003 | Choi et al. | 148/653 |
| 2003/0131914 A1* | 7/2003 | Jeong et al. | 148/541 |
| 2004/0144454 A1* | 7/2004 | Jeong et al. | 148/654 |
| 2005/0173030 A1* | 8/2005 | Jeong et al. | 148/541 |
| 2006/0065335 A1 | 3/2006 | Mizutani et al. | |
| 2009/0114318 A1* | 5/2009 | Arai et al. | 148/593 |
| 2010/0003535 A1* | 1/2010 | Hara et al. | 428/586 |
| 2010/0236668 A1* | 9/2010 | Hara et al. | 148/521 |
| 2011/0023991 A1* | 2/2011 | Fujishiro et al. | 138/177 |

FOREIGN PATENT DOCUMENTS

| | | |
|---|---|---|
| EP | 0 861 915 | 9/1998 |
| EP | 1 375 681 | 1/2004 |
| EP | 1 375 681 A3 | 2/2004 |
| JP | 08-325635 | 12/1996 |
| JP | 2000-256777 | 9/2000 |
| JP | 2001-303191 | 10/2001 |
| JP | 2001-355039 | 12/2001 |
| JP | 2003-138340 | 5/2003 |
| JP | 2004-076101 | 3/2004 |
| JP | 2004-143509 | 5/2004 |
| JP | 2005-60838 | 3/2005 |
| JP | 2005-146407 | 6/2005 |
| JP | 2006-028627 | 2/2006 |
| WO | 99-05335 | 2/1999 |
| WO | 99-05336 | 2/1999 |

OTHER PUBLICATIONS

Extended European Search Report dated Jun. 1, 2011 issued in corresponding EPO Application No. EP 07 85 0314.

* cited by examiner

HIGH STRENGTH THICK WELDED STEEL PIPE FOR LINE PIPE SUPERIOR IN LOW TEMPERATURE TOUGHNESS AND METHOD OF PRODUCTION OF THE SAME

This application is a national stage application of International Application No. PCT/JP2007/073740, filed Dec. 4, 2007, which claims priority to Japanese Application Nos. 2006-327099, filed Dec. 4, 2006; and 2007-309477, filed Nov. 29, 2007, each of which is incorporated by reference in its entirety.

TECHNICAL FIELD

The present invention relates to high strength thick welded steel pipe for line pipe superior in low temperature toughness suitable for line pipe for transport of crude oil and natural gas.

BACKGROUND ART

At the present time, as the material for trunk pipelines for long distance transport of crude oil and natural gas, steel pipe for line pipe of the American Petroleum Institute (API) standard X70 (tensile strength 564 MPa or higher) or higher and up to X80 (tensile strength 620 MPa or higher) has been put into practical use. In recent years, for the purpose of increasing the efficiency of transport of crude oil and natural gas, studies have been made on increasing the internal pressure of pipelines. Along with this, X70 or higher or further X80 or higher high strength steel pipe for line pipe having a tensile strength of 600 MPa or more is being required to be made further greater in thickness.

As opposed to this, the method of using controlled rolling and controlled cooling to make the metal structure fine bainite and produce thick-gauge steel plate excellent in strength and toughness is being produced (for example, Japanese Patent Publication (A) No. 2000-256777, Japanese Patent Publication (A) No. 2004-76101, and Japanese Patent Publication (A) No. 2004-143509). Such conventional X80 or more high strength line pipe has a thickness of at most less than 25 mm. Thick line pipe of 25 mm or more or 30 mm or more is being demanded.

In general, when producing thick-gauge steel plate, at the center part of plate thickness, the rolling by the controlled rolling easily becomes insufficient. Further, it also becomes difficult to secure the cooling speed by the controlled cooling. Further, when producing thick steel pipe, thick-gauge steel plate is formed by an UO process into a pipe shape, then the ends are made to abut against each other and the seams are welded by arc welding. This seam welding results in large heat input if the steel pipe becomes thicker. The weld heat affected zone (called the "HAZ") becomes coarser in grain size, so the drop in low temperature toughness becomes an important problem.

As technology for improving the low temperature toughness of the HAZ of high strength steel pipe for line pipe, the method of utilizing intragranular transformation to make the structure of the HAZ finer has been proposed (for example, Japanese Patent Publication (A) No. 8-325635, Japanese Patent Publication (A) No. 2001-355039, and Japanese Patent Publication (A) No. 2003-138340). The method proposed in Japanese Patent Publication (A) No. 8-325635 causes the formation of acicular ferrite as nuclei for oxides. The method proposed in Japanese Patent Publication (A) No. 2001-355039 and Japanese Patent Publication (A) No. 2003-138340 forms intragranular bainite using composite inclusions of oxides and sulfides as nuclei.

Utilization of the intragranular bainite is extremely effective for improving the low temperature toughness of the HAZ. However, if the cooling speed falls due to the increased thickness of the steel pipe, the transformation to bainite becomes insufficient, intragranular ferrite is formed, and the strength falls. For this reason, increasing the thickness of high strength steel pipe for line pipe superior in low temperature toughness has been difficult.

DISCLOSURE OF THE INVENTION

Further, the inventors prepared X70 or X80 or higher high strength thick-gauge steel plate for line pipe having a plate thickness of 25 mm or more and a tensile strength (TS) of 600 MPa or more. As a result, it was learned that the problems due to the increase of plate thickness of steel plate were far more serious than anticipated. In particular, at the center part of plate thickness, the rolling by the controlled rolling and the cooling speed due to the controlled cooling become insufficient so the toughness remarkably drops compared with the surface layer part of the steel plate. Further, the inventors investigated the metal structure of the center part of plate thickness of steel plate and as a result obtained the discovery that in high strength thick-gauge steel plate for line pipe, it is extremely difficult to make the center part of plate thickness a fine bainite structure.

The present invention solves such problems unanticipated from the prior art and provides high strength, thick welded steel pipe for line pipe superior in low temperature toughness able to secure superior low temperature toughness of the HAZ even if having a thickness of 25 mm or more, further 30 mm or more, and a method of production of the same.

The present invention reduces the C and Al and adds suitable amounts of Mo and B to raise the hardenability, controls the hardenability parameter of the carbon equivalent Ceq and the weldability parameter of the crack susceptibility parameter Pcm to optimum ranges, makes the base material and the HAZ of the welded steel pipe a fine metal structure mainly comprised of bainite, and utilizes the intragranular bainite formed using oxides of Ti as nuclei to increase the fineness of the effective crystal grain size of the HAZ in particular to thereby obtain high strength welded steel pipe for line pipe excellent in low temperature toughness and has as its gist the following:

(1) High strength thick line pipe use welded steel pipe superior in low temperature toughness comprising steel pipe obtained by seam welding base material steel plate formed into a pipe shape, characterized in that said base material steel plate contains, by mass %, C: 0.010 to 0.050%, Si: 0.01 to 0.50%, Mn: 0.50 to 2.00%, S: 0.0001 to 0.0050%, Ti: 0.003 to 0.030%, Mo: 0.10 to 1.50%, B: 0.0003 to 0.0030%, and O: 0.0001 to 0.0080%, limits P: 0.050% or less and Al: 0.020% or less, and has a balance of iron and unavoidable impurities, a Ceq found by the following formula 1 is 0.30 to 0.53, a Pcm found by the following formula 2 is 0.10 to 0.20, the following formula 3 is satisfied, the metal structure of said base material steel plate is comprised of an area ratio of 20% or less of polygonal ferrite and an area ratio of 80% or more of bainite, an effective crystal grain size is 20 μm or less, and an effective crystal grain size of the weld heat affected zone is 150 μm or less:

$$Ceq = C + Mn/6 + (Ni+Cu)/15 + (Cr+Mo+V)/5 \quad \text{formula 1}$$

$$Pcm = C + Si/30 + (Mn+Cu+Cr)/20 + Ni/60 + Mo/15 + V/10 + 5B \quad \text{formula 2}$$

$$10C + 100Al + 5Mo + 5Ni < 3.3 \quad \text{formula 3}$$

where, C, Si, Mn, Ni, Cu, Cr, Mo, V, B, and Al are contents (mass %) of the elements (2) High strength thick line pipe use welded steel pipe superior in low temperature toughness as set forth in the above (1) characterized in that the thickness of the base material steel plate is 25 to 40 mm.

(3) High strength welded steel pipe for line pipe superior in low temperature toughness as set forth in the above (1) or (2) characterized in that a tensile strength of said base material steel plate using the peripheral direction of said steel pipe as the tension direction is 600 to 800 MPa.

(4) High strength thick line pipe use welded steel pipe superior in low temperature toughness as set forth in any one of the above (1) to (3), characterized in that said base material steel plate further contains, by mass %, one or both of Cu: 0.05 to 1.50% and Ni: 0.05 to 5.00%.

(5) High strength thick line pipe use welded steel pipe superior in low temperature toughness as set forth in any one of the above (1) to (4) characterized in that said base material steel plate further contains, by mass %, one or more of Cr: 0.02 to 1.50%, V: 0.010 to 0.100%, Nb: 0.001 to 0.200%, Zr: 0.0001 to 0.0500%, and Ta: 0.0001 to 0.0500%.

(6) High strength thick line pipe use welded steel pipe as set forth in any one of the above (1) to (5), characterized in that said base material steel plate further contains, by mass %, one or more of Mg: 0.0001 to 0.0100%, Ca: 0.0001 to 0.0050%, REM: 0.0001 to 0.0050%, Y: 0.0001 to 0.0050%, Hf: 0.0001 to 0.0050%, Re: 0.0001 to 0.0050%, and W: 0.01 to 0.50%.

(7) High strength thick line pipe use welded steel pipe superior in low temperature toughness as set forth in any one of the above (1) to (6) characterized in that the weld metal contains, by mass %, C: 0.010 to 0.100%, Si: 0.01 to 0.50%, Mn: 1.0 to 2.0%, Ni: 0.2 to 3.2%, Cr+Mo+V: 0.2 to 2.5%, Al: 0.001 to 0.100%, Ti: 0.003 to 0.050%, and 0: 0.0001 to 0.0500%, limits P: 0.020% or less and S: 0.010% or less, and has a balance of iron and unavoidable impurities.

(8) A method of production of high strength welded steel pipe for line pipe superior in low temperature toughness characterized by producing steel during which adding Si and Mn for weak deoxidation, then adding Ti to adjust the ingredients to those described in any one of the above (1) and (4) to (6), casting the steel, hot rolling the obtained steel slab, and further forming the obtained steel plate into a pipe shape and seam welding the seam portions.

(9) A method of production of high strength welded steel pipe for line pipe superior in low temperature toughness as set forth in the above (8) characterized by heating said steel slab to 1000° C. or more, hot rolling it from 900° C. below by a rolling ratio until the end of rolling of 2.5 or more, and water cooling by a stopping temperature of 600° C. or less.

(10) A method of production of high strength thick line pipe use welded steel pipe superior in low temperature toughness as set forth in the above (8) or (9) characterized by forming said base material steel plate into a pipe shape by a UO process, welding the seam portions from the inner and outer surfaces by submerged arc welding, then expanding the pipe.

(11) A method of production of high strength thick line pipe use welded steel pipe superior in low temperature toughness as set forth in the above (10) characterized in that the heat input of said submerged arc welding is 4.0 to 10.0 kJ/mm.

(12) A method of production of high strength thick line pipe use welded steel pipe superior in low temperature toughness as set forth in any one of the above (8) to (11) characterized by heat treating the seam weld zone.

(13) A method of production of high strength thick line pipe use welded steel pipe superior in low temperature toughness as set forth in the above (12) characterized by heating treating the seam weld zone in the range of 300 to 500° C.

BEST MODE FOR CARRYING OUT THE INVENTION

Figure 1:
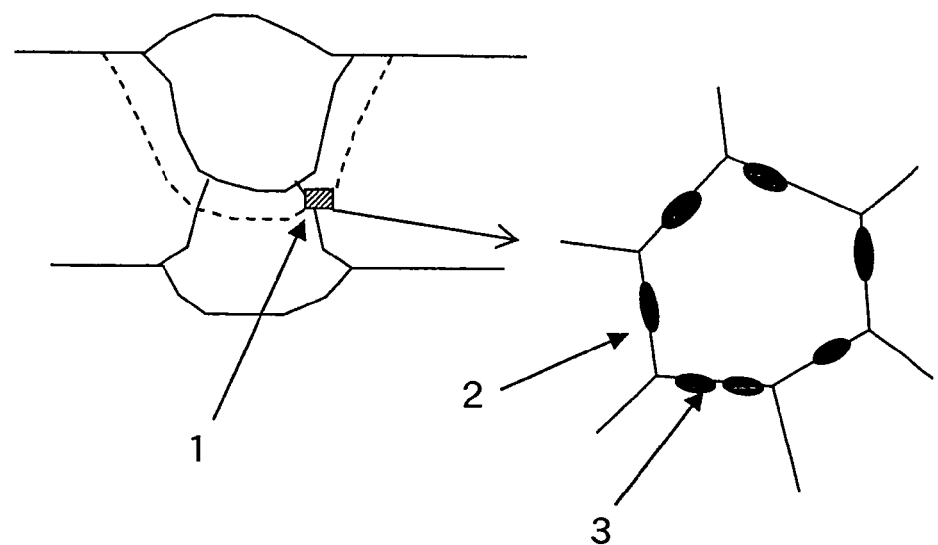
FIG. 1 is a schematic view of a reheated HAZ.

The present invention is welded steel pipe made of a steel material reducing the content of C and making the metal structure a low temperature transformed structure mainly comprised of bainite to improve the toughness in which B is added to raise the hardenability and in which the intragranular bainite is utilized, in particular, to make the effective crystal grain size of the HAZ finer and improve the low temperature toughness. That is, the present invention has as its greatest feature the reduction of the amount of Al, the control of the amount of oxygen and addition of a suitable amount of Ti to disperse fine inclusions extremely effective as the nuclei for intragranular transformation, and the utilization of these as nuclei for intragranular transformation to make the effective crystal grain size of the base material steel plate finer. Note that, below, base material steel plate will also be simply be referred to as "steel plate". The welded steel pipe is also simply referred to as "steel pipe".

The intragranular bainite of the HAZ is obtained by transformation of the intragranular ferrite formed by intragranular transformation at a high temperature using the above-mentioned fine inclusions as nuclei at the time of cooling. Therefore, making the amounts of addition of Mo and B and the hardenability parameter Ceq and weldability parameter Pcm the optimum ranges is extremely effective for forming intragranular bainite even in steel pipe with a large large thickness like in the present invention, that is, even if the cooling speed is slower. Due to the formation of this intragranular bainite, the low temperature toughness of the HAZ is remarkably improved without lowering the strength. Further, intragranular bainite may contribute to suppression of softening of the HAZ as well.

The mechanism of formation of the intragranular bainite is believed to be as follows: anion-hole type oxides can hold large numbers of ions of Mn. Further, MnS easily precipitates as a composite in oxides. For this reason, an Mn depleted layer is formed around the oxides and sulfides. This Mn-depleted layer acts as nuclei for transformation when heating steel to a high temperature where the metal structure becomes an austenite phase then cooling it. Usually, petal shaped intragranular ferrite is formed. This intragranular ferrite has a large supercooling degree when the cooling speed is fast or the hardenability is high. At the time of cooling, it transforms to bainite to become intragranular bainite.

A typical anion-hole type oxide is a fine oxide mainly comprised of Ti. Petal type intragranular bainite is formed using this as nuclei. Further, fine sulfides mainly comprised of Mn coprecipitate as fine oxides mainly comprised of Ti. Note that, depending on the composition of ingredients of the steel, sometimes the oxides include one or more of Al, Si, Mn, Cr, Mg, and Ca and the sulfides include one or more of Ca, Cu, and Mg. The size of inclusions forming the nuclei of intragranular bainite can be measured by a transmission type electron microscope (TEM). A size of 0.01 to 5 μm in range is preferable.

When a large amount of intragranular bainite forms in the HAZ, the mixture of martensite and austenite (Martensite-Austenite Constituent, called "MA") forming the starting points of fracture becomes finer and the low temperature toughness is greatly improved. If keeping the amount of C down to 0.05% or less and making the fine inclusions disperse, intragranular bainite is formed, the intragranular structure becomes finer, and the Charpy fracture unit, that is, the effective crystal grain size, also becomes smaller. Further, intragranular bainite is harder than intragranular ferrite, so formation of intragranular bainite can suppress the softening of the HAZ.

At the HAZ of the center part of thickness of the high strength welded steel pipe for line pipe (near the part of ½ of the thickness, called the "½t part"), as shown schematically in FIG. 1, the coarse MA present along the old austenite grain boundaries of the reheated HAZ become starting points of fracture and sometimes impair the toughness. In FIG. 1, 1 indicates the reheated HAZ, 2 a mixture of martensite and austenite, and 3 an old austenite grain boundary. The "reheated HAZ" is the portion of the weld metal and HAZ near the weld line in the preceding welding being reheated by subsequent welding. Usually, the HAZ, while differing somewhat due to the heat input at the time of welding, is the portion within 10 mm from the weld line. For example, when providing notches at positions 1 mm or 2 mm from the weld line, the Charpy absorption energy at −40° C. sometimes becomes less than 50 J.

The inventors engaged in studies to improve the low temperature toughness by increasing the fineness of the effective crystal grain size of HAZ and suppressing the formation of MA. First, they obtained samples from steel materials comprised of various compositions of ingredients performed heat treatment simulating the heat history of the reheated HAZ envisioning submerged arc welding of the seam portions in production of steel pipe of a thickness of 25 to 40 mm (called a "reheated HAZ reproduction test"). For this, they heated each steel material to 1400° C., immediately cooled it to room temperature, heated it to 750° C., and immediately cooled it to room temperature. The cooling speed from 800° C. to 500° C. at the time of cooling was made 2 to 15° C./s. From the steel materials after the reheated HAZ reproduction test, the inventors obtained V-notch test pieces based on JIS Z 2242 and ran Charpy impact tests at −40° C. The results of toughness evaluated by the reheated HAZ reproduction test are shown in FIG. 2.

Figure 2:
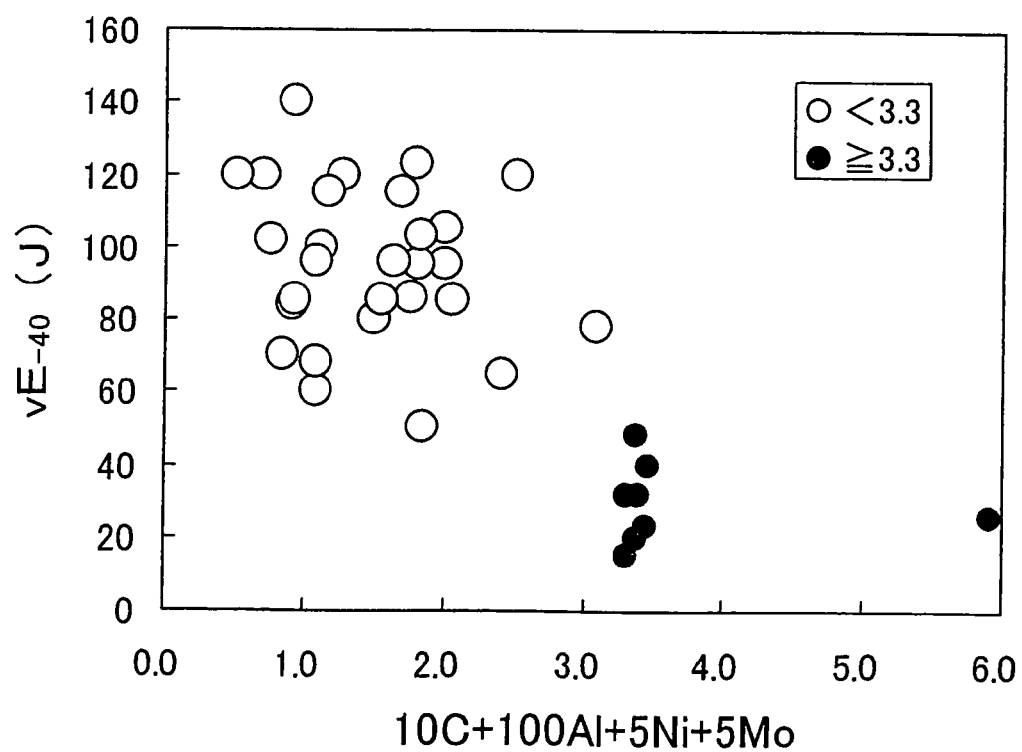
FIG. 2 is a view showing the effects of the ingredients on the toughness of the reheated HAZ.

FIG. 2 shows the relationship between the 10C+100Al+5Ni+5Mo and the Charpy absorption energy at −40° C. of the reheated HAZ obtained by the simulated tests. The inventors studied the effects of C, Mo, and Ni, which affect the formation of MA, and Al, which affects the intragranular transformation, on the reproduced HAZ toughness. Further, based on the obtained results, they primarily regressed the relationship between the amounts of addition of the elements and the effects to obtain the parameter 10C+100Al+5Ni+5Mo correlated with the reproduced HAZ toughness. From FIG. 2, it became clear that if suppressing 10C+100Al+5Ni+5Mo to less than 3.3, the Charpy absorption energy of the reheated HAZ at −40° C. becomes 50 J or more. Note that, the inventors also confirmed the effects of the work hardening when cold working steel plate to produce steel pipe. As a result, the TS sometimes rose about 20 to 30 MPa. The toughness was little affected both at the center part of plate thickness and at the surface layer part. The effect was of the extent of measurement error.

Samples excellent in low temperature toughness of the reheated HAZ were measured for effective crystal grain size by EBSP (Electron Back Scattering Pattern). As a result, it was learned that the toughness was 150 μm or less. Further, the inventors investigated the metal structure and inclusions. As a result, it became clear that mainly Ti fine oxides, composite oxides, and composite sulfides were formed and that intragranular bainite was formed at the HAZ using these as nuclei for precipitation. That is, the effective crystal grain size of the HAZ becomes 150 μm or less due to the formation of intragranular bainite and the low temperature toughness becomes good.

Next, the inventors engaged in intensive research to satisfy the toughness of the base material steel plate. This is because if the thickness becomes 25 mm or more, the problems arise that the rolling ratio in the pre-recrystallization temperature region cannot be secured, the ½t part becomes coarser in crystal grain size, and the Charpy energy falls. The inventors engaged in studies and as a result discovered that if making the area ratio of the polygonal ferrite 20% or less, making the area ratio of the bainite 80% or more, and making the effective crystal grain size of the base material steel plate 20 μm or less, the base material steel plate is improved in strength and toughness and, in particular, the drop in toughness of the center part of plate thickness can be suppressed. Specifically, the Charpy absorption energy at −40° C. of the test piece taken from near the surface, that is, at a position about 2 to 12 mm from the surface of the steel material, becomes 200J or more. It is possible to make the Charpy energy when taking the test piece from the ½t part, that is, the substantial center of thickness, 100J or more. Note that, Charpy impact test was performed based on JIS Z 2242 using a V-notch test piece at −40° C.

The mainly Ti fine oxides, composite oxides, and composite sulfides of the present invention are effective not only for formation of the intragranular bainite of the HAZ, but also for making the base material steel plate finer in effective crystal grain size. In particular, it became possible to increase the fineness of the effective crystal grain size at the ½ t part of the base material steel plate, which was difficult in the past, by the mainly Ti fine oxides, composite oxides, and composite sulfides. The reason is considered to be as follows.

First, when rolling in the pre-recrystallization temperature region is secured, the usual transformation from the grain boundaries is promoted, so intragranular transformation from the oxides, composite oxides, and composite sulfides is difficult. This is believed to be because if the crystal grain size becomes small due to securing the rolling, compared with intragranular transformation, the speed of growth of bainite formed from the grain boundaries becomes too large. That is, it is believed that the transformation from the grain boundaries is completed before the intragranular transformation.

On the other hand, when the rolling ratio in the pre-recrystallization temperature region is not sufficient, the crystal grain size becomes coarser in particular at the center part of the plate thickness, so the growth of bainite formed from the grain boundary also becomes slower. For this reason, it is believed that the effective crystal grain size becomes finer due to the intragranular transformation from the mainly Ti oxides, composite oxides, and composite sulfides. Further, it is believed that the fine oxides act as pinning particles and suppress growth of crystal grains which is also effective for increasing the fineness of the effective crystal grain size of the base material steel plate.

For this reason, in the present invention, control of the amount of oxygen in the steelmaking process is extremely important. In particular, when adjusting the composition of ingredients of the steel, it is necessary to add Si and Mn so that the contents become the above-mentioned ranges for weak deoxidation, then add Ti. The oxygen concentration when adding Ti is preferably 0.001 to 0.003%. Due to this, it is possible to disperse Ti oxides, specifically, $Ti_2O_3$, of a grain size of 0.01 to 10 μm and a number per 1 μm² area of 10 to 1000/mm². Due to this, formation of the intragranular transformation is promoted and the base material steel plate and HAZ of the welded steel pipe become finer in effective crystal grain size.

When adjusting the composition of ingredients by such a steelmaking process and hot rolling the cast steel slab, by making the rolling ratio from 900° C. to the end of rolling 2.5 or more, preferably 3.0 or more, it is possible to make the effective crystal grain size of the base material steel plate 20 μm or less.

The effective grain size is the value obtained using EBSP to convert an area surrounded by boundaries having a crystal orientation difference of 15° or more to the circle equivalent diameter. Further, "polygonal ferrite" is observed as white mass-shaped structures not including coarse cementite, MA, or other coarse precipitates in the grains in the optical microscope structure. In the optical microscope structure of the base material steel plate, martensite, residual austenite, and MA are sometimes included as the balance of polygonal ferrite and bainite.

In the present invention, bainite is defined as a structure where carbides precipitate between the laths or masses of ferrite or where carbides precipitate in the laths. Further, martensite is a structure where carbides do not precipitate between the laths or in the laths. The residual austenite is austenite formed at a high temperature which remains in the base material steel plate or welded steel pipe.

Further, due to the heat treatment of the weld zone, the coarse MA formed along the old austenite grain boundaries of the HAZ breaks down into fine cementite, so the low temperature toughness is improved. Due to this, the associated part of the ½t part or the associated part+1 mm at a low temperature is improved in toughness. For example, if heating the weld zone to 300 to 500° C. in temperature, the V-notch Charpy absorption energy at the low temperature of −40° C. can be made 50 J or more. Therefore, when used at an extremely low temperature of −40° C. or less, it is preferable to further heat treat the structure forming intragranular bainite and obtain a mixed structure of intragranular bainite and cementite.

Below, the reasons for limitation of the base material steel plate of the present invention will be explained. Note that the HAZ is the heat affected zone which does not melt at the time of welding, so the ingredients of the HAZ are the same as the base material.

C: C is an element raising the strength of the steel, but in the present invention, the content of C is limited to obtain a metal structure mainly comprised of bainite and achieve both high strength and high toughness. If the amount of C is smaller than 0.010%, the strength is insufficient. If over 0.050%, the toughness falls. For this reason, in the present invention, the optimum amount of C is made 0.010 to 0.050% in range.

Si: Si is a deoxidizing element important in the present invention. To obtain this effect, inclusion of 0.01% or more of Si in the steel is required. On the other hand, if the content of Si is over 0.50%, the toughness of the HAZ falls, so the upper limit is made 0.50%.

Mn: Mn is an element used as a deoxidizing agent, is necessary for securing the strength and toughness of the base material steel plate, and, further, forms MnS and other sulfides effective as nuclei for intragranular transformation. It is extremely important in the present invention. To obtain these effects, it is necessary to include 0.50% of Mn, but if the content of Mn exceeds 2.00%, the toughness of the HAZ is impaired. Therefore, the range of content of the Mn is made 0.50 to 2.00%. Note that, Mn is an inexpensive element, so to secure the hardenability, is preferably included in 1.00% or more. The optimum lower limit is 1.50% or more.

P: P is an impurity and remarkably lowers the toughness of the base material steel plate if included in over 0.050%. Therefore, the upper limit of the content of P was made 0.050%. To raise the toughness of the HAZ, the content of P is preferably made 0.010% or less.

S: S, in the present invention, is an important element for forming MnS and other sulfides effective as nuclei for intragranular transformation. If the content of S becomes less than 0.0001%, the amount of formation of sulfides falls and intragranular transformation does not remarkably occur, so it has to be made 0.0001% or more. On the other hand, if the base material steel plate contains S in over 0.0050%, coarse sulfides are formed and the toughness is reduced, so the upper limit of the amount of S is made 0.0050% or less. To raise the toughness of the HAZ, the upper limit of the amount of S is preferably made 0.0030% or less.

Al: Al is a deoxidizing agent, but in the present invention, to make oxides of Ti finely disperse, it is extremely important to make the upper limit of the amount of Al 0.020% or less. Further, to promote the intragranular transformation, the amount of Al is preferably made 0.010% or less. Further, the preferable upper limit is 0.008% or less.

Ti: Ti, in the present invention, is an extremely important element for making oxides of Ti, which effectively act as nuclei for intragranular transformation, finely disperse. However, if including Ti in excess, carbonitrides are formed and the toughness is impaired. Therefore, in the present invention, the content of Ti has to be made 0.003 to 0.030%. Further, Ti is a powerful deoxidizing agent, so if the amount of oxygen when adding Ti is large, coarse oxides are formed. For this reason, when producing steel, it is necessary to deoxidize the steel in advance by Si and Mn and lower the amount of oxygen. If the oxides of Ti become coarser, intragranular transformation becomes difficult and the effect of pinning the grain boundaries becomes smaller, so the effective crystal grain size of the base material steel plate and the HAZ of the welded steel pipe sometimes becomes coarser.

Mo: Mo is an element effective for raising the hardenability and forming carbonitrides to raise the strength. To obtain this effect, addition of 0.10% or more is necessary. On the other hand, if adding Mo over 1.50%, the toughness falls, so the upper limit of the amount of Mo is made 1.50% or less.

B: B is an element causing an increase in the hardenability if becoming solid solute in steel, but if added in excess, forms coarse BN and in particular causes a decrease in the toughness of the HAZ, so the upper limit of the amount of B is made 0.0030%. The welded steel pipe of the present invention adds B, which raises the hardenability, in an amount of 0.0003% or more and controls the hardenability parameter of the carbon equivalent Ceq and the weldability parameter of the crack susceptibility parameter Pcm to the optimum ranges to secure the strength and weldability. Note that addition of 0.0003% or more of B is also effective for suppressing the formation of ferrite from the grain boundaries. Further, due to the deliberate addition of B, if fine BN is formed, the solid solute N falls and along with this the toughness of the HAZ rises, so it is preferable to make the amount of B over 0.0005%.

O: Oxygen is an element unavoidably included in steel, but in the present invention, to form oxides containing Ti, the amount of O has to be limited. The amount of the oxygen remaining in the steel during casting, that is, the amount of O in the base material steel plate, has to be made 0.0001 to 0.0080%. This is because if the amount of O is less than 0.0001%, the number of oxide particles is not sufficient, while if over 0.0080%, the number of coarse oxide particles becomes greater and the base material and the toughness of the HAZ are impaired. Further, if the increase in the amount of oxygen results in coarsening of the mainly Ti oxides, the base material steel plate and HAZ of the welded steel pipe become coarser in effective crystal grain size.

Further, as elements improving the strength and toughness, it is also possible to add one or more of Cu, Ni, Cr, V, Nb, Zr, and Ta. Further, when the contents of these elements are lower than the preferable lower limits, there is no particular detrimental effect, so these elements can be deemed as impurities.

Cu and Ni: Cu and Ni are effective elements raising the strength without lowering the toughness. To obtain that effect, the lower limits of the amount of Cu and the amount of Ni are preferably made 0.05% or more. On the other hand, the upper limit of the amount of Cu is preferably 1.50% to suppress the formation of cracks at the time of heating and welding the steel slab. The upper limit of the amount of Ni is preferably 5.00% since inclusion in excess impairs the weldability. Note that, Cu and Ni are preferably included as a composite to suppress the formation of surface defects. Further, from the viewpoint of the cost, the upper limits of the Cu and Ni are preferably made 1.00% or less.

Cr, V, Nb, Zr, and Ta: Cr, V, Nb, Zr, and Ta are elements forming carbides and nitrides and raising the strength of the steel by precipitation strengthening. One or more may be included. To effectively raise the strength, the lower limit of the amount of Cr is 0.02%, the lower limit of the amount of V is 0.010%, the lower limit of the amount of Nb is 0.001%, and the lower limits of the amount of Zr and the amount of Ta are both 0.0001%. On the other hand, if excessively adding Cr, due to the rise in the hardenability, the strength rises and the toughness is sometimes impaired, so the upper limit of the amount of Cr is preferably made 1.50%. Further, if excessively adding V, Nb, Zr, and Ta, the carbides and nitrides become coarser and the toughness is sometimes impaired, so the upper limit of the amount of V is preferably made 0.100%, the upper limit of the amount of Nb is preferably made 0.200%, and the upper limits of the amounts of Zr and Ta are preferably both made 0.0500%.

Further, to control the form of the inclusions and improve the toughness, it is possible to add one or more of Mg, Ca, REM, Y, Hf, Re, and W. Further, if the contents of these elements are lower than the preferable lower limits, there is no particular detrimental effect, so these elements can be deemed as impurities.

Mg: Mg is an element effective for increasing the fineness of oxides and controlling the form of the sulfides. In particular, to obtain the effect of the fine oxides of Mg acting as nuclei for intragranular transformation and, further, suppressing the coarsening of the grain size as pinning particles, addition of 0.0001% or more is preferable. On the other hand, if adding an amount of Mg over 0.0100%, coarse oxides are formed and the toughness of the base material steel plate and the HAZ of the welded steel pipe is sometimes lowered, so the upper limit of the amount of Mg is preferably made 0.0100%.

Ca and REM: Ca and REM are elements useful for control of the form of the sulfides and forming granules to suppress the formation of MnS stretched in the rolling direction and improve the characteristics of the steel material in the plate thickness direction, in particular, the lamellar tear resistance. To obtain this effect, the lower limits of the amount of Ca and the amount of REM are both preferably made 0.0001% or more. On the other hand, if the upper limits of the amount of Ca and the amount of REM are over 0.0050%, the oxides increase, fine Ti-containing oxides are reduced, and intragranular transformation is sometimes inhibited, so 0.0050% or less is preferable.

Y, Hf, Re, and W: Y, Hf, W, and Re are elements having effects similar to Ca and REM. If excessively added, intragranular transformation is sometimes inhibited. For this reason, the preferable ranges of the amount of Y, the amount of Hf, and the amount of Re are respectively 0.0001 to 0.0050% and the preferable range of the amount of W is 0.01 to 0.50%.

Further, in the present invention, to secure the hardenability of the base material steel plate and HAZ of the welded steel pipe, make the area ratio of bainite of the base material 80% or more, and form intragranular bainite at the HAZ, the carbon equivalent Ceq of the following formula 1 calculated from the content (mass %) of the C, Mn, Ni, Cu, Cr, Mo, and V is made 0.30 to 0.53.

$$Ceq=C+Mn/6+(Ni+Cu)/15+(Cr+Mo+V)/5 \quad \text{formula 1}$$

Further, to secure the low temperature toughness of the base material steel plate and the HAZ of the welded steel pipe, the crack susceptibility parameter Pcm of the following formula 2 calculated from the content (mass %) of the C, Si, Mn, Cu, Cr, Ni, Mo, V, and B is made 0.10 to 0.20.

$$Pcm=C+Si/30+(Mn+Cu+Cr)/20+Ni/60+Mo/15+V/10+5B \quad \text{formula 2}$$

Further, to secure the low temperature toughness of the HAZ, it is necessary that the contents (mass %) of C, Al, Mo, and Ni satisfy the following formula 3:

$$10C+100Al+5Mo+5Ni<3.3 \quad \text{formula 3}$$

Note that the selectively included elements Ni, Cu, Cr, and V are impurities when less than the above-mentioned preferred lower limits, so are entered as "0" in the above formula 1 to formula 3.

If the metal structure of the base material steel plate used for the welded steel pipe has an area ratio of bainite of 80% or more and an area ratio of polygonal ferrite of 20% or less, the balance of strength and toughness becomes good. Further, if the formation of mainly Ti oxides results in the effective crystal grain size being made 20 µm or less, the base material steel plate becomes good in toughness. Note that, polygonal ferrite is also effective for making the base material steel plate finer in effective crystal grain size. An area ratio of 3% or more is preferable. Further, the thickness of the base material steel plate is preferably 25 mm or more and the tensile strength in the direction corresponding to the circumferential direction of the steel pipe is preferably 600 MPa or more. This is to prevent fracture due to internal pressure at the time of use as line pipe. Note that, when raising the internal pressure is necessary, the thickness of the base material steel plate is preferably made 30 mm or more. On the other hand, the thickness of the base material steel plate is preferably 40 mm or less and the tensile strength in the direction corresponding to the circumferential direction of the steel pipe is preferably 800 MPa or less. This is because due to the rise in thickness and the rise in the tensile strength, the load when forming the base material steel plate by the UO process increases. Note that, usually, the "direction corresponding to the circumferential direction of the steel pipe" is the plate width direction of the base material steel plate.

Next, the method of production will be explained.

After making the steel by the above-mentioned steelmaking process, it is cast to a steel slab. The casting may be performed by an ordinary method, but from the viewpoint of the productivity, continuous casting is preferable. The steel slab is heated for hot rolling.

The heating temperature of the hot rolling is made 1000° C. or more. This is to perform the hot rolling at a temperature where the structure of the steel becomes an austenite single phase, that is, the austenite region, and to make the base material steel plate finer in crystal grain size. The upper limit is not defined, but to suppress coarsening of the effective crystal grain size, making the reheating temperature 1250° C. or less is preferable.

The hot rolling may be immediately started after extraction from the heating furnace, so the starting temperature of the hot rolling is not particularly defined. To make the effective crystal grain size of the base material steel plate finer, the rolling ratio at the recrystallization region over 900° C. is preferably made 2.0 or more. The rolling ratio at the recrystallization region is the ratio of the plate thickness of the steel slab and the plate thickness at 900° C.

Next, if making the rolling ratio at the pre-recrystallization region at 900° C. or less 2.5 or more, after water cooling, the effective crystal grain size of the base material steel plate becomes 20 µm or less. To make the effective crystal grain size of the base material steel plate finer, making the rolling ratio at the pre-recrystallization region at 900° C. or less 3.0 or more is preferable. Note that, in the present invention, the "rolling ratio of the pre-recrystallization region rolling" means the ratio of the plate thickness at 900° C. divided by the plate thickness after the end of the rolling.

Further, the upper limits of the rolling ratios at the pre-recrystallization region and recrystallization region are not defined, but if considering the plate thickness of the steel slab before rolling and the plate thickness of the base material steel plate after rolling, the limits are usually 12.0 or less.

The rolling end temperature is preferably the temperature where the structure of the base material steel plate becomes the austenite single phase or more during the hot rolling. That is, the rolling end temperature is preferably made $Ar_3$ or more, but it is all right for a small amount of polygonal ferrite to be formed during rolling, so the temperature may be made $Ar_3$-50° C. or more.

$Ac_3$ and $Ar_3$ can be calculated by the contents (mass %) of the C, Si, Mn, P, Cr, Mo, W, Ni, Cu, Al, V, and Ti.

$$Ac_3=910-203\sqrt{C}-15.2Ni+44.7Si+104V+31.5Mo+13.1W-30M-11Cr-20Cu+700P+400Al+400Ti$$

$$Ar_3=910-310C-55Ni-80Mo-80Mn-15Cr-20Cu$$

Further, after the end of the rolling, the sheet is water cooled. If the water cooling stop temperature is made 600° C. or less, the above-mentioned metal structure is obtained and the base material steel plate becomes excellent in toughness. The lower limit of the water cooling stop temperature is not defined. Water cooling may be performed until room temperature, but if considering the productivity and hydrogen defects, 150° C. or more is preferable. The steel of the present invention has a composition of ingredients containing B and raising the hardenability, so even if air cooling after ending the rolling, bainite easily forms, but depending on the composition of ingredients and the heating temperature, sometimes polygonal ferrite is formed and the area ratio of bainite becomes less than 80%.

When forming the base material steel plate into a pipe shape, then arc welding the abutted parts to obtain welded steel pipe, the steel plate is preferably shaped by the UOE process using a C-press, U-press, and O-press.

For the arc welding, from the viewpoint of the toughness of the weld metal and productivity, it is preferable to employ submerged arc welding. In particular, when producing welded steel pipe having a thickness of 25 to 40 mm, it is preferable to make the heat input of the submerged arc welding from the inner and outer surfaces 4.0 to 10.0 kJ/mm. If in this range of heat input, in welded steel pipe of the present invention having the above-mentioned composition of ingredients, intragranular bainite forms in the HAZ, the HAZ effective crystal grain size becomes 150 µm or less, and a superior low temperature toughness is obtained.

In particular, this is because when performing the submerged arc welding one pass at a time from the inner and outer surfaces, if making the heat input less than 4.0 kJ/mm, weld metal of the tack welding performed before the main welding sometimes remains between the inner surface metal and outer surface metal. Further, if making the heat input of the submerged arc welding 10.0 kJ/mm or less, even with steel pipe of a thickness of 25 to 40 mm, the old austenite grain size of the HAZ can be made 500 µm or less. This is effective for raising the toughness. Note that, the heat input when welding from the inner surface and the heat input when welding from the outer surface do not have to be made the same conditions. Some difference in heat input is also possible.

If making the heat inputs of the submerged arc welding from the inner and outer surfaces 4.0 to 10.0 kJ/mm, when the thickness of the welded steel pipe is 25 to 40 mm, the cooling speed from 800° C. to 500° C. at the time of cooling the HAZ becomes 2 to 15° C./s. Even with a cooling speed slower than usual, in the welded steel pipe of the present invention having the above-mentioned composition of ingredients, intragranular bainite forms in the HAZ, the HAZ becomes 150 µm or less in effective crystal grain size, and a superior low temperature toughness is obtained.

Further, the wire used for the welding is preferably made the following ingredients so as to make the composition of ingredients of the weld metal the range explained later considering dilution of the ingredients by the base material steel plate. That is, it is a composition of ingredients containing, by mass %, C: 0.010 to 0.120%, Si: 0.05 to 0.50%, Mn: 1.0 to 2.5%, and Ni: 2.0 to 8.5%, containing one or more of Cr, Mo, and V in Cr+Mo+V: 1.0 to 5.0% in range, further containing Al: 0.100% or less and Ti: 0.050% or less, and having a balance of Fe and unavoidable impurities. In accordance with need, B may also be included in 0.0001 to 0.0050%.

Further, the composition of ingredients of the weld metal will be explained.

C is an element extremely effective for improving the strength. Inclusion of 0.010% or more is preferable. However, if the amount of C is too great, weld low temperature cracks easily occur. In particular, sometimes the HAZ at the so-called T-cross part where the local weld zone and seam welding cross hardens and the toughness is impaired. For this reason, making the upper limit of the amount of C 0.100% is preferable. To improve the toughness of the weld metal, it is more preferable to make the upper limit 0.050% or less.

Si is preferably included in an amount of 0.01% or more so as to prevent the weld defect of blowholes. On the other hand, if excessively included, the low temperature toughness is remarkably degraded, so the upper limit is preferably made 0.50% or less. In particular, when performing the welding a plurality of times, sometimes the low temperature toughness of the reheated weld metal deteriorates, so the upper limit is more preferably made 0.40% or less.

Mn is an element effective for securing a superior balance of strength and toughness. A lower limit of 1.0% or more is preferable. However, if Mn is included in a large amount, segregation is promoted. Not only is the low temperature toughness degraded, but also production of the weld wire used for welding becomes difficult, so the upper limit is preferably made 2.0% or less.

P and S are impurities. To reduce the deterioration of the low temperature toughness and low temperature crack susceptibility of the weld metal, the upper limits of these are preferably made 0.020% and 0.010% or less. Note that, from the viewpoint of the low temperature toughness, the more preferable upper limit of P is 0.010%.

Ni is an element raising the hardenability and securing strength and, further, improving the low temperature toughness. Inclusion of 0.2% or more is preferable. On the other hand, if the content of Ni becomes too great, high temperature cracks sometimes are formed, so the upper limit was made 3.2% or less.

Cr, Mo, and V are all elements raising the hardenability. To increase the strength of the weld metal, one or more of these may be included in a total of 0.2% or more. On the other hand, if the total of one or more of Cr, Mo, and V exceeds 2.5%, the low temperature toughness sometimes deteriorates, so the upper limit is preferably made 2.5% or less.

Al is an element added for improving the refining and solidification when producing weld wire. To utilize the fine Ti-based oxides to suppress the coarsening of the grain size of the weld metal, inclusion of 0.001% or more of Al is preferable. However, Al is an element promoting the formation of MA, so the preferable upper limit of the content is made 0.100% or less.

Ti is an element forming fine oxides serving as nuclei for intragranular transformation and contributing to increased fineness of the grain size of the weld metal. Inclusion of 0.003% or more is preferable. On the other hand, if including Ti in a large amount, a large number of carbides of Ti is formed and the low temperature toughness is degraded, so the upper limit is preferably made 0.050% or less.

O is an impurity. The amount of oxygen finally remaining in the weld metal is often 0.0001% or more. However, if the amount of O remains in an amount over 0.0500%, the amount of coarse oxides becomes greater and the toughness of the weld metal sometimes falls, so the upper limit is preferably made 0.0500% or less.

The weld metal may further contain B.

B is an element increasing the hardenability of the weld metal. To raise the strength, inclusion of 0.0001% or more is preferable. On the other hand, if the content of B is over 0.0050%, the toughness is sometimes impaired, so the upper limit is preferably made 0.0050% or less.

The weld metal sometimes includes other elements due to dilution from the base material steel plate, for example, the Cu, Nb, Zr, Ta, Mg, Ca, REM, Y, Hf, Re, W, etc. selectively added to the base material, and sometimes includes the Zr, Nb, Mg, and other elements added in accordance with need to improve the refining and solidification of the weld wire. These are unavoidably included impurities.

To improve the circularity of the steel pipe after the seam welding, the pipe may be expanded. When increasing the circularity of the steel pipe by expanding it, deformation to the plastic region is required, so the pipe expansion rate has to be made 0.7% or more. The pipe expansion rate shows the difference of the outer circumferential length of the steel pipe after expansion and the outer circumferential length of the steel pipe before expansion divided by the outer circumferential length of the steel pipe before expansion expressed as a percentage. If the pipe expansion rate is made over 2%, sometimes the plastic deformations of the base material and the weld zone cause a drop in the toughness. Therefore, the pipe expansion rate is preferably made 0.7 to 2.0%.

Further, the weld zone and HAZ of the steel pipe are preferably heat treated. In particular, if heating to 300 to 500° C. in temperature, the coarse MA formed along the old austenite grain boundaries breaks down into bainite and fine cementite and the toughness is improved. If the heating temperature is less than 300° C., sometimes the coarse MA does not sufficiently break down and the effect of improvement of the toughness is not sufficient, so the lower limit is preferably made 300° C. or more. On the other hand, if heating the weld zone to over 500° C., precipitates form and the toughness of the weld metal sometimes deteriorates, so the upper limit is preferably made 500° C. or less. If the MA formed at the reheated HAZ breaks down into bainite and cementite, in observation by an SEM, the shape is similar to MA, but fine white precipitates are included inside and differentiation from MA becomes possible.

The weld zone and HAZ may be heat treated by heating from the outer surface by a burner or by high frequency heating. The pipe may be immediately cooled after its outer surface reaches the heat treatment temperature, but preferably it is held there for 1 to 600 seconds to promote the breakdown of the MA. However, if considering the cost of the facilities and the productivity, the holding time is preferably made 300 seconds or less.

EXAMPLES

Next, examples of the present invention will be explained. Steels having the chemical ingredients of Table 1 with the oxygen concentrations at the time of adding Ti adjusted to 0.001 to 0.003% in range were produced and made into steel slabs having thicknesses of 240 mm. These steel slabs were heated to the heating temperatures shown in Table 2 and hot rolled to 35 to 140 mm in the recrystallization temperature regions of 950° C. or more. Further, the hot rolling operations were performed making the rolling ratios in the pre-recrystallization regions of the temperature range from 900° C. to the end of rolling the rolling ratios shown in Table 2. The end temperatures of the hot rolling operations were made $Ar_3$-50° C. or more. The water cooling was started at 750° C. and was stopped at various temperatures.

TABLE 1

| Prod. No. | Ingredients (mass %) | | | | | | | | | | | | |
|---|---|---|---|---|---|---|---|---|---|---|---|---|---|
| | C | Si | Mn | P | S | Al | Ti | Mo | B | O | Cu | Ni | Cr |
| 1 | 0.035 | 0.10 | 1.95 | 0.005 | 0.0005 | 0.004 | 0.012 | 0.15 | 0.0010 | 0.0042 | | | |
| 2 | 0.045 | 0.13 | −1.81 | 0.008 | 0.0026 | 0.003 | 0.005 | 0.11 | 0.0008 | 0.0008 | 0.10 | 0.15 | |
| 3 | 0.040 | 0.08 | 1.90 | 0.003 | 0.0018 | 0.008 | 0.012 | 0.15 | 0.0025 | 0.0032 | | | 0.15 |
| 4 | 0.047 | 0.07 | 1.90 | 0.004 | 0.0023 | 0.001 | 0.016 | 0.15 | 0.0012 | 0.0025 | | | |
| 5 | 0.035 | 0.25 | 1.85 | 0.009 | 0.0018 | 0.007 | 0.012 | 0.15 | 0.0020 | 0.0024 | | | |
| 6 | 0.035 | 0.02 | 1.80 | 0.003 | 0.0006 | 0.005 | 0.013 | 0.15 | 0.0015 | 0.0028 | | | |
| 7 | 0.035 | 0.22 | 1.85 | 0.002 | 0.0018 | 0.004 | 0.024 | 0.15 | 0.0026 | 0.0022 | | 0.20 | |
| 8 | 0.042 | 0.25 | 1.78 | 0.004 | 0.0016 | 0.005 | 0.012 | 0.15 | 0.0019 | 0.0035 | | | |

TABLE 1-continued

| | | | | | | | | | | | | | |
|---|---|---|---|---|---|---|---|---|---|---|---|---|---|
| 9 | 0.019 | 0.31 | 1.86 | 0.006 | 0.0008 | 0.004 | 0.024 | 0.11 | 0.0025 | 0.0032 | 0.15 | 0.05 | |
| 10 | 0.026 | 0.09 | 1.78 | 0.006 | 0.0006 | 0.001 | 0.013 | 0.15 | 0.0014 | 0.0005 | | | 0.25 |
| 11 | 0.040 | 0.28 | 1.90 | 0.004 | 0.0004 | 0.006 | 0.012 | 0.15 | 0.0010 | 0.0031 | | | |
| 12 | 0.050 | 0.32 | 1.80 | 0.003 | 0.0019 | 0.006 | 0.008 | 0.15 | 0.0008 | 0.0025 | | | |
| 13 | 0.023 | 0.24 | 1.70 | 0.004 | 0.0021 | 0.003 | 0.005 | 0.15 | 0.0012 | 0.0024 | | | |
| 14 | 0.025 | 0.31 | 1.96 | 0.004 | 0.0025 | 0.005 | 0.018 | 0.14 | 0.0014 | 0.0032 | | 0.13 | |
| 15 | <u>0.003</u> | 0.18 | 1.95 | 0.005 | 0.0026 | 0.005 | 0.012 | 0.20 | 0.0026 | 0.0027 | | | |
| 16 | <u>0.075</u> | 0.45 | 1.75 | 0.007 | 0.0023 | 0.007 | 0.013 | 0.10 | 0.0020 | 0.0020 | 0.10 | 0.15 | |
| 17 | 0.050 | 0.12 | <u>3.50</u> | 0.015 | 0.0029 | 0.007 | 0.008 | 0.25 | 0.0029 | 0.0031 | | 0.20 | 0.15 |
| 18 | 0.045 | 0.25 | 1.93 | <u>0.060</u> | 0.0019 | 0.009 | 0.019 | 0.40 | 0.0015 | 0.0008 | | | |
| 19 | 0.049 | 0.17 | 1.86 | 0.003 | <u>0.0110</u> | 0.008 | 0.017 | 0.22 | 0.0027 | 0.0020 | | 0.20 | |
| 20 | 0.050 | 0.09 | 2.00 | 0.003 | 0.0023 | 0.007 | <u>0.064</u> | 0.27 | 0.0014 | 0.0033 | | 0.17 | |
| 21 | 0.030 | 0.41 | 1.96 | 0.003 | 0.0026 | 0.005 | 0.028 | 0.20 | 0.0010 | <u>0.0100</u> | | 0.30 | |
| 22 | 0.035 | 0.35 | 1.85 | 0.002 | 0.0025 | 0.005 | <u>0.001</u> | 0.20 | 0.0015 | 0.0025 | | | |
| 23 | 0.036 | 0.25 | 1.85 | 0.004 | 0.0005 | 0.008 | 0.015 | 0.11 | 0.0010 | 0.0035 | 0.10 | 0.15 | |
| 24 | 0.010 | 0.10 | 1.20 | 0.008 | 0.0020 | 0.002 | 0.015 | 0.11 | 0.0005 | 0.0025 | | | |
| 25 | 0.050 | 0.25 | 2.00 | 0.010 | 0.0025 | 0.005 | 0.015 | 0.20 | 0.0010 | 0.0023 | 0.50 | 0.50 | 0.15 |
| 26 | 0.035 | 0.15 | 1.90 | 0.008 | 0.0015 | 0.007 | 0.010 | 0.11 | 0.0008 | 0.0023 | | | |
| 27 | 0.042 | 0.25 | 1.85 | 0.007 | 0.0010 | 0.005 | 0.015 | 0.15 | 0.0011 | 0.0025 | | | 0.15 |

| | Ingredients (mass %) | | | | | | |
|---|---|---|---|---|---|---|---|
| Prod. No. | V | Nb | Zr, Ta | Mg, Ca, REM, Y, Hf, Re, W | Ceq | Pcm | Form. 3 |
| 1 | | 0.030 | | | 0.39 | 0.15 | 1.5 |
| 2 | | 0.040 | | | 0.39 | 0.16 | 2.1 |
| 3 | | 0.030 | Y: 0.0010 | Y: 0010 | 0.42 | 0.17 | 2.0 |
| 4 | 0.050 | 0.026 | | | 0.40 | 0.17 | 1.3 |
| 5 | | 0.030 | Hf: 0.0010, Re: 0.002 | Hf: 0.0010, Re: 0.002 | 0.37 | 0.16 | 1.8 |
| 6 | | | | Mg: 0.0020, W: 0.10 | 0.37 | 0.14 | 1.6 |
| 7 | | 0.045 | | | 0.39 | 0.16 | 2.5 |
| 8 | | 0.030 | Zr: 0.0037 | | 0.37 | 0.16 | 1.7 |
| 9 | | 0.040 | | Ca: 0.0030 | 0.36 | 0.15 | 1.4 |
| 10 | | 0.030 | | REM: 0.0023 | 0.40 | 0.15 | 1.1 |
| 11 | 0.030 | 0.010 | Ta: 0.0040 | | 0.39 | 0.16 | 1.8 |
| 12 | | 0.030 | | REM: 0.0007 | 0.38 | 0.16 | 1.8 |
| 13 | | | | | 0.34 | 0.13 | 1.3 |
| 14 | | 0.025 | | | 0.39 | 0.15 | 3.1 |
| 15 | | 0.030 | Zr: 0.0057 | | 0.37 | 0.13 | 1.6 |
| 16 | | 0.040 | | Ca: 0.0035 | 0.40 | 0.20 | 2.7 |
| 17 | | 0.030 | | REM: 0.0023 | <u>0.73</u> | 0.27 | <u>3.5</u> |
| 18 | 0.030 | 0.025 | Ta: 0.0040 | Y: 0.0010 | 0.45 | 0.19 | <u>3.3</u> |
| 19 | | 0.030 | | REM: 0.0007 | 0.42 | 0.18 | <u>3.4</u> |
| 20 | | | | Ca: 0.0011 | 0.45 | 0.18 | <u>3.4</u> |
| 21 | | 0.050 | | Mg: 0.0015 | 0.42 | 0.17 | <u>3.3</u> |
| 22 | | 0.030 | Zr: 0.0030 | | 0.38 | 0.16 | 1.8 |
| 23 | | 0.040 | | Ca: 0.0035 | 0.38 | 0.16 | 2.5 |
| 24 | | 0.015 | | Mg: 0.0026 | <u>0.23</u> | <u>0.08</u> | 0.8 |
| 25 | 0.100 | 0.010 | | Ca: 0.0025 | 0.54 | 0.23 | <u>4.5</u> |
| 26 | | 0.010 | | | 0.37 | 0.15 | 1.6 |
| 27 | | 0.015 | | | 0.41 | 0.17 | 1.7 |

* Ceq = C + Mn/6 + (Ni + Cu)/15 + (Cr + Mo + V)/5
* Pcm = C + Si/30 + (Mn + Cu + Cr)/20 + Ni/60 + Mo/15 + V/10 + 5B.
* Formula 3 = 10C + 100Al + 5Mo + 5Ni
* Blank fields in ingredients indicate no addition.
* Underlines in table indicate outside range of present invention.

TABLE 2

| Production No. | Heating temperature °C. | Rolling ratio | Water cooling stop temperature °C. | Heat treatment temperature °C. | Plate thickness mm |
|---|---|---|---|---|---|
| 1 | 1050 | 3.5 | 300 | 300 | 35 |
| 2 | 1020 | 3.9 | 400 | | 30 |
| 3 | 1080 | 4.5 | 250 | 500 | 32 |
| 4 | 1050 | 4.1 | 300 | | 25 |
| 5 | 1020 | 3.3 | 340 | | 28 |
| 6 | 1000 | 3.5 | 250 | | 36 |
| 7 | 1010 | 3.9 | 350 | | 35 |
| 8 | 1040 | 4.5 | 480 | | 27 |
| 9 | 1050 | 4.1 | 150 | 400 | 29 |
| 10 | 1000 | 3.3 | 100 | | 26 |
| 11 | 1000 | 2.6 | 450 | | 40 |
| 12 | 1010 | 3.5 | 530 | 460 | 34 |
| 13 | 1050 | 3.7 | 100 | | 36 |
| 14 | 1060 | 4.1 | 150 | | 29 |
| 15 | 1080 | 3.3 | 450 | | 34 |
| 15 | 1060 | 3.4 | 360 | | 33 |
| 17 | 1050 | 3.5 | 320 | 350 | 31 |
| 18 | 1040 | 3.4 | 250 | | 34 |

TABLE 2-continued

| Production No. | Heating temperature °C. | Rolling ratio | Water cooling stop temperature °C. | Heat treatment temperature °C. | Plate thickness mm |
|---|---|---|---|---|---|
| 19 | 1060 | 3.7 | 350 | | 35 |
| 20 | 1050 | 3.9 | 260 | | 31 |
| 21 | 1050 | 3.4 | 460 | | 40 |
| 22 | 1045 | 3.5 | 500 | | 25 |
| 23 | 1080 | 1.0 | 450 | 300 | 26 |
| 24 | 1050 | 3.0 | 450 | | 32 |
| 25 | 1040 | 3.0 | 500 | | 31 |
| 26 | 1150 | 2.4 | 400 | | 32 |
| 27 | 1060 | 3.5 | 700 | | 33 |

\* Rolling ratio is rolling ratio at 900° C. or less until end of rolling
\* Blank fields in heat treatment indicate no heat treatment.
\* Underlines in table indicate outside range of present invention.

V-notch test pieces having the plate width direction as the longitudinal direction and having notches provided in parallel with the plate thickness direction were prepared from the obtained steel plates based on JIS Z 2242. The sampling positions of the Charpy test pieces were made the surface layer parts, that is, positions about 2 to 12 mm from the surfaces, and the ½t parts, that is, the substantial centers in the thickness. Charpy tests were run at −40° C. to find the absorption energy. The tensile properties were evaluated using API standard test pieces. Note that when forming a base material steel plate having a plate thickness of 25 to 40 mm into a welded steel pipe, the small extent of the effect of the strain introduced by the shaping process at the center part of plate thickness is confirmed by analysis by the finite element method. Further, the steel plates were cold worked to make welded steel pipes which were checked for the effects of work hardening. As a result, the TS sometimes rose 20 to 30 MPa or so. The toughness was little affected at both the center part of plate thickness and the surface layer part. This was the extent of measurement error.

The microstructures of the center parts of plate thicknesses of the base material steel plates were observed under an optical microscope, the area ratios of the polygonal ferrite and bainite were measured, and the residual structures were confirmed. The base material steel plates were measured for effective crystal grain size by EBSP.

Next, considering dilution by the base material steel plates, weld wires having compositions of ingredients containing, by mass %, C: 0.010 to 0.120%, Si: 0.05 to 0.5%, Mn: 1.0 to 2.5%, Al: 0.100% or less, and Ti: 0.050% or less, further containing, in accordance with need, one or more of Cr, Mo, V in Cr+Mo+V: 1.0 to 5.0% in range, containing B: 0.0001 to 0.0050%, and having balances of Fe and unavoidable impurities were used for submerged arc welding by weld heat inputs of 4.0 to 10.0 kJ/mm one pass each from the inner and outer surfaces to prepare weld joints. Further, some of the joints were heat treated at the temperatures shown in Table 2. Note that samples were taken from the weld metals and analyzed for ingredients. The tensile strengths of the weld metals were measured based on JIS Z 3111. The chemical ingredients and tensile strengths of the weld metals are shown in Table 3.

TABLE 3

| Prod. No. | Ingredients of weld metal (mass %) | | | | | | | | | | Heat input kJ/mm | Weld metal Strength (MPa) |
|---|---|---|---|---|---|---|---|---|---|---|---|---|
| | C | Si | Mn | P | S | Ni | Cr + Mo + V | Al | Ti | O | | |
| 1 | 0.061 | 0.26 | 1.7 | 0.008 | 0.0020 | 1.4 | 0.5 | 0.005 | 0.020 | 0.0150 | 6.5 | 664 |
| 2 | 0.055 | 0.20 | 1.7 | 0.007 | 0.0030 | 1.2 | 0.5 | 0.008 | 0.019 | 0.0180 | 6.0 | 650 |
| 3 | 0.075 | 0.14 | 1.8 | 0.006 | 0.0030 | 0.9 | 0.7 | 0.005 | 0.025 | 0.0200 | 6.1 | 670 |
| 4 | 0.065 | 0.12 | 1.7 | 0.008 | 0.0040 | 1.2 | 0.7 | 0.008 | 0.026 | 0.0250 | 6.3 | 700 |
| 5 | 0.065 | 0.09 | 1.7 | 0.008 | 0.0030 | 1.1 | 0.5 | 0.006 | 0.021 | 0.0240 | 5.9 | 700 |
| 6 | 0.075 | 0.19 | 1.6 | 0.007 | 0.0030 | 1.1 | 1.0 | 0.008 | 0.026 | 0.0300 | 5.7 | 720 |
| 7 | 0.071 | 0.24 | 1.6 | 0.007 | 0.0020 | 1.3 | 1.0 | 0.009 | 0.021 | 0.0260 | 6.3 | 710 |
| 8 | 0.056 | 0.28 | 1.6 | 0.008 | 0.0030 | 1.2 | 0.5 | 0.008 | 0.026 | 0.0190 | 6.5 | 690 |
| 9 | 0.090 | 0.30 | 1.7 | 0.009 | 0.0020 | 2.0 | 0.9 | 0.004 | 0.030 | 0.0200 | 5.4 | 700 |
| 10 | 0.078 | 0.21 | 1.6 | 0.007 | 0.0020 | 1.5 | 0.1 | 0.006 | 0.035 | 0.0250 | 7.0 | 770 |
| 11 | 0.065 | 0.35 | 1.4 | 0.008 | 0.0040 | 1.8 | 0.6 | 0.005 | 0.024 | 0.0160 | 5.5 | 710 |
| 12 | 0.056 | 0.25 | 1.6 | 0.008 | 0.0030 | 1.3 | 0.5 | 0.005 | 0.004 | 0.0200 | 6.0 | 700 |
| 13 | 0.065 | 0.19 | 1.4 | 0.009 | 0.0040 | 1.5 | 0.8 | 0.006 | 0.045 | 0.0220 | 6.3 | 700 |
| 14 | 0.065 | 0.25 | 1.6 | 0.005 | 0.0020 | 1.4 | 0.5 | 0.007 | 0.025 | 0.0230 | 6.2 | 720 |
| 15 | 0.003 | 0.16 | 1.4 | 0.005 | 0.0060 | 1.3 | 0.6 | 0.008 | 0.026 | 0.0250 | 6.4 | 450 |
| 16 | 0.090 | 0.25 | 1.5 | 0.006 | 0.0010 | 1.5 | 0.5 | 0.006 | 0.023 | 0.0260 | 5.5 | 1000 |
| 17 | 0.065 | 0.28 | 2.0 | 0.007 | 0.0030 | 1.7 | 1.1 | 0.005 | 0.015 | 0.0160 | 5.8 | 800 |
| 18 | 0.057 | 0.25 | 1.5 | 0.015 | 0.0020 | 1.5 | 1.1 | 0.006 | 0.020 | 0.0200 | 6.4 | 670 |
| 19 | 0.059 | 0.15 | 1.6 | 0.008 | 0.0100 | 2.0 | 1.0 | 0.008 | 0.035 | 0.0260 | 6.3 | 670 |
| 20 | 0.046 | 0.26 | 1.6 | 0.008 | 0.0050 | 1.9 | 0.9 | 0.009 | 0.020 | 0.0310 | 6.7 | 660 |
| 21 | 0.064 | 0.19 | 1.7 | 0.006 | 0.0030 | 1.8 | 0.5 | 0.008 | 0.025 | 0.0400 | 6.2 | 720 |
| 22 | 0.052 | 0.16 | 1.5 | 0.009 | 0.0040 | 1.7 | 0.4 | 0.006 | 0.016 | 0.0190 | 6.3 | 650 |
| 23 | 0.057 | 0.15 | 1.8 | 0.008 | 0.0030 | 1.6 | 0.6 | 0.006 | 0.018 | 0.0210 | 6.1 | 690 |
| 24 | 0.056 | 0.12 | 1.7 | 0.005 | 0.0020 | 1.5 | 0.6 | 0.005 | 0.020 | 0.0250 | 5.9 | 650 |
| 25 | 0.060 | 0.25 | 1.6 | 0.005 | 0.0020 | 1.4 | 0.8 | 0.006 | 0.036 | 0.0210 | 5.7 | 710 |
| 26 | 0.057 | 0.17 | 1.7 | 0.006 | 0.0010 | 1.6 | 0.9 | 0.004 | 0.003 | 0.0320 | 5.4 | 700 |
| 27 | 0.061 | 0.15 | 1.6 | 0.007 | 0.0010 | 1.5 | 1.1 | 0.008 | 0.030 | 0.0250 | 5.6 | 710 |

\* Underlines in table indicate outside range of present invention.

Small pieces were taken from the weld joints. The effective crystal grain sizes of their HAZ's were measured by EBSP. Further, bainite formed into petal shapes starting from the inclusions was defined as the intragranular bainite and measured for area ratio. Further, the Charpy absorption energy of the HAZ was measured based on JIS Z 2242 using V-notch test pieces at −40° C. V-notches were provided at positions 1 mm at the base material side from the weld lines. The measurement was conducted at −40° C. Further, the width direction vertical to the weld metal was made the longitudinal direction of the test piece, the weld metal was made the substantial center of the parallel part, API standard test pieces were taken, and tensile tests were performed to judge the fracture position. The results are shown in Table 4. The intragranular transformed structure of Table 4 is the area ratio of the intragranular bainite.

Note that some of the base material steel plates were shaped by the UO process, welded by submerged arc welding, and expanded to obtain steel pipes which were investigated for microstructures and mechanical properties. These were confirmed to be equivalent to the microstructures and mechanical properties of the based materials of the steel plates and HAZs of the joints.

tions of the base material steel plates outside the range of the present invention. As shown in Table 4, these are comparative examples. Among these, Production No. 15 is an example where the amount of C was small, the area ratio of the polygonal ferrite increased, and the tensile strength fell. Further, Production Nos. 16 and 17 had large amounts of C and Mn, had larger strengths, and fell in toughness of the base material and the HAZ. Production Nos. 18 and 19 had large amounts of the impurities of P and S and fell in toughness.

Further, Production No. 20 had a large amount of Ti, Production No. 21 had a large amount of oxygen, and Production No. 22 had a small amount of Ti, so the effective crystal grain size of the HAZ became larger and the toughness deteriorated. Production No. 24 had a low Ceq and Pcm, so the strength fell, while Production No. 25 had a high Ceq and Pcm, so the strength of the base material steel plate became higher, the toughness fell, and, further, formula 3 was not

TABLE 4

| | Metal structure of base material | | | Metal structure of HAZ | | Base material | | | | Joint tensile | | |
|---|---|---|---|---|---|---|---|---|---|---|---|---|
| Prod. No. | Bainite % | Polygonal ferrite % | Bal. % | Effective crystal grain size μm | Effective crystal grain size μm | Intragranular transformed structure % | Tensile strength MPa | Surface layer $vE_{-40}(J)$ | ½t $vE_{-40}(J)$ | HAZ $vE$ −40 J | test Breakage position | Remarks |
| 1 | 95 | 5 | 0 | 7 | 120 | 70 | 620 | 286 | 160 | 80 | Base material | Inv. ex. |
| 2 | 90 | 8 | 2 | 8 | 100 | 66 | 640 | 222 | 170 | 95 | Base material | |
| 3 | 85 | 10 | 5 | 10 | 104 | 71 | 620 | 250 | 150 | 105 | Base material | |
| 4 | 86 | 9 | 5 | 7 | 134 | 77 | 646 | 213 | 175 | 120 | Base material | |
| 5 | 90 | 4 | 6 | 8 | 121 | 76 | 630 | 286 | 160 | 95 | Base material | |
| 6 | 95 | 3 | 2 | 10 | 67 | 68 | 630 | 286 | 155 | 98 | Base material | |
| 7 | 95 | 5 | 0 | 8 | 92 | 65 | 630 | 286 | 157 | 120 | Base material | |
| 8 | 85 | 9 | 6 | 10 | 120 | 62 | 656 | 238 | 160 | 115 | Base material | |
| 9 | 90 | 7 | 3 | 6 | 125 | 75 | 650 | 320 | 167 | 110 | Base material | |
| 10 | 86 | 10 | 4 | 5 | 110 | 70 | 618 | 385 | 175 | 96 | Base material | |
| 11 | 86 | 9 | 5 | 13 | 136 | 78 | 620 | 250 | 158 | 86 | Base material | |
| 12 | 84 | 11 | 5 | 4 | 94 | 65 | 700 | 200 | 162 | 103 | Base material | |
| 13 | 94 | 5 | 1 | 11 | 95 | 68 | 614 | 435 | 175 | 115 | Base material | |
| 14 | 86 | 8 | 6 | 11 | 130 | 62 | 650 | 400 | 167 | 88 | Base material | |
| 15 | <u>65</u> | <u>30</u> | 5 | 15 | 112 | 62 | 354 | 500 | 190 | 85 | Base material | |
| 16 | 100 | 0 | 0 | 12 | 147 | 35 | 1050 | 133 | 37 | 23 | HAZ | |
| 17 | 100 | 0 | 0 | 14 | 149 | 25 | 950 | 85 | 50 | 40 | HAZ | |
| 18 | 95 | 2 | 3 | 15 | 143 | 55 | 660 | 10 | 10 | 32 | Base material | Comp. exc. |
| 19 | 92 | 5 | 3 | 13 | 145 | 51 | 662 | 10 | 10 | 20 | Base material | |
| 20 | 86 | 10 | 4 | 17 | <u>235</u> | 22 | 650 | 200 | 165 | 32 | Base material | |
| 21 | 86 | 9 | 5 | 15 | <u>218</u> | 15 | 690 | 333 | 155 | 15 | Base material | |
| 22 | 86 | 12 | 2 | 13 | <u>220</u> | 35 | 630 | 286 | 153 | 48 | Base material | |
| 23 | 86 | 12 | 2 | <u>26</u> | 105 | 70 | 648 | 108 | 65 | 65 | Base material | |
| 24 | 95 | 1 | 4 | 10 | 120 | 65 | 380 | 480 | 170 | 100 | Base material | |
| 25 | 91 | 6 | 3 | 13 | 135 | 62 | 850 | 130 | 85 | 35 | HAZ | |
| 26 | 92 | 3 | 5 | <u>21</u> | 125 | 63 | 630 | 286 | 165 | 85 | Base material | |
| 27 | 97 | 1 | 2 | 13 | 140 | 68 | 580 | 238 | 158 | 30 | Base material | |

* Balance is total of area ratios of residual austenite, martensite, and MA
* Intragranular transformed structure is area ratio of intragranular bainite.
* Underlines in table indicate outside range of present invention.

Production Nos. 1 to 14 are invention examples. The base material steel plates had effective crystal grain sizes of 20 μm or less and the HAZ's had effective crystal grain sizes of 150 μm or less. Further, the base materials and HAZ's had Charpy absorption energies at −40° C. exceeding 50 J and good low temperature toughnesses. In these invention examples, the fracture positions in the tensile tests of the joints were the base materials, and softening of the HAZ did not become a problem.

On the other hand, Production Nos. 15 to 19 and 22 had ingredients of the base material steel plates and ingredients of the weld metal outside the range of the present invention, while Steel Nos. 20, 21, 24, and 25 had ingredients of the base material steel plates outside the range of the present invention. Production Nos. 23, 26, and 27 had production condisatisfied, so the toughness of the HAZ fell and the sample broke at the HAZ as a result of a tensile test of the joint.

Further, Production Nos. 23 and 26, as shown in Table 2, had small rolling ratios of rolling, so the effective crystal grain size of the base material steel plate became greater and the toughness of the base material steel plate fell. Production No. 27 had a high water cooling stop temperature after hot rolling, so the strength fell. Further, Production Nos. 16, 17, and 25 had high strengths of the base material steel plates, so broke at the HAZ as a result of a tensile test of the joint.

INDUSTRIAL APPLICABILITY

According to the present invention, it becomes possible to secure low temperature toughness of the base material steel plate of steel pipe for line pipe even with a thickness of 25 mm or more or further 30 mm or more, in particular the center part of thickness of the base material steel plate and the HAZ and it becomes possible to provide high strength thick welded steel pipe for line pipe superior in low temperature toughness and a method of production of the same, so the contribution to industry is remarkable.

The invention claimed is:

1. High strength thick line pipe use welded steel pipe, superior in low temperature toughness, the welded steel pipe comprising steel pipe obtained by seam welding a base material steel plate formed into a pipe shape, wherein said base material steel plate comprises, by mass %:
    C: 0.010 to 0.050%,
    Si: 0.01 to 0.50%,
    Mn: 0.50 to 2.00%,
    S: 0.0001 to 0.0050%,
    Ti: 0.003 to 0.030%,
    Mo: 0.10 to 1.50%,
    B: 0.0003 to 0.0030%,
    O: 0.0001 to 0.0080%, and
    a balance of iron and unavoidable impurities, wherein P and Al are present at most as impurities, wherein
    P is limited to 0.050% or less, and
    Al is limited to 0.020% or less, and wherein
    Ceq found by the formula $$Ceq=C+Mn/6+(Ni+Cu)/15+(Cr+Mo+V)/5$$

is 0.30 to 0.53,
    Pcm found by the formula $$Pcm=C+Si/30+(Mn+Cu+Cr)/20+Ni/60+Mo/15+V/10+5B$$

is 0.10 to 0.20, and $$10C+100Al+5Mo+5Ni<3.3, \text{wherein}$$

C, Si, Mn, Ni, Cu, Cr, Mo, V, B, and Al are amounts of the elements in mass %; and wherein
    a metal structure of said base material steel plate has a polygonal ferrite area ratio of no more than 20%,
    a bainite area ratio of at least 80%,
    an effective crystal grain size of no more than 20 μm, and
    an effective crystal grain size of a weld heat affected zone of no more than 150 μm.

2. The high strength thick line pipe use welded steel pipe as set forth in claim 1, wherein the base material steel plate has a thickness of 25 to 40 mm.

3. The high strength thick line pipe use welded steel as set forth in claim 1, wherein said base material steel plate has a tensile strength measured using a peripheral direction of said steel pipe as the tension direction of 600 to 800 MPa.

4. The high strength thick line pipe use welded steel pipe as set forth in claim 1, wherein said base material steel plate further comprises, by mass %, one or both of
    Cu: 0.05 to 1.50% and
    Ni: 0.05 to 5.00%.

5. The high strength thick line pipe use welded steel pipe as set forth in claim 1, wherein said base material steel plate further comprises, by mass %, one or more of
    Cr: 0.02 to 1.50%,
    V: 0.010 to 0.100%,
    Nb: 0.001 to 0.200%,
    Zr: 0.0001 to 0.0500%, and
    Ta: 0.0001 to 0.0500%.

6. The high strength thick line pipe use welded steel pipe as set forth in claim 1, wherein said base material steel plate further comprises, by mass %, one or more of
    Mg: 0.0001 to 0.0100%,
    Ca: 0.0001 to 0.0050%,
    REM: 0.0001 to 0.0050%,
    Y: 0.0001 to 0.0050%,
    Hf: 0.0001 to 0.0050%,
    Re: 0.0001 to 0.0050%, and
    W: 0.01 to 0.50%.

7. The high strength thick line pipe use welded steel pipe as set forth in claim 1, wherein the steel pipe further comprises a weld metal comprising, by mass %,
    C: 0.010 to 0.100%,
    Si: 0.01 to 0.50%,
    Mn: 1.0 to 2.0%,
    Ni: 0.2 to 3.2%,
    Cr+Mo+V: 0.2 to 2.5%,
    Al: 0.001 to 0.100%,
    Ti: 0.003 to 0.050%, and
    O: 0.0001 to 0.0500%, and
    a balance of iron and unavoidable impurities, wherein P and S are present at most as impurities, and
    P is limited to 0.020% or less, and
    S is limited to 0.010% or less.

8. A method of production of high strength line pipe use welded steel pipe for line pipe superior in low temperature toughness the method comprising:
    adding deoxidizing agents, comprising Si and Mn, then adding Ti to form a steel composition,
    casting the steel composition, forming a steel slab;
    hot rolling the steel slab, forming a steel plate; and
    forming the steel plate into a pipe shape having seam portions; and
    seam welding the seam portions; wherein,
    after adding the Ti, the steel comprises, by mass %,:
    C: 0.010 to 0.050%,
    Si: 0.01 to 0.50%,
    Mn: 0.50 to 2.00%,
    S: 0.0001 to 0.0050%,
    Ti: 0.003 to 0.030%,
    Mo: 0.10 to 1.50%,
    B: 0.0003 to 0.0030%,
    O: 0.0001 to 0.0080%, and
    a balance of iron and unavoidable impurities, wherein P and Al are present at most as impurities, wherein
    P is limited to 0.050% or less, and
    Al is limited to 0.020% or less, and wherein
    Ceq found by the formula $$Ceq=C+Mn/6+(Ni+Cu)/15+(Cr+Mo+V)/5$$

is 0.30 to 0.53,
    Pcm found by the formula $$Pcm=C+Si/30+(Mn+Cu+Cr)/20+Ni/60+Mo/15+V/10+5B$$

is 0.10 to 0.20, and $$10C+100Al+5Mo+5Ni<3.3, \text{wherein}$$

C, Si, Mn, Ni, Cu, Cr, Mo, V, B, and Al are amounts of the elements in mass %.

9. The method of production of high strength line pipe use welded steel pipe as set forth in claim 8, further comprising heating said steel slab to a temperature of at least 1000° C., hot rolling from the heat steel while maintaining the heated steel at a temperature of no more than 900° C. to obtain a rolling ratio of 2.5 or more, and water cooling the hot rolled steel to a temperature of no more than 600° C.

10. The method of production of high strength thick line pipe use welded steel pipe as set forth in claim 8, further comprising forming said base material steel plate into a pipe shape by a UO process, welding the seam portions from the inner and outer surfaces by submerged arc welding, and then expanding the pipe.

11. The method of production of high strength thick line pipe use welded steel pipe as set forth in claim 10, wherein said submerged arc welding provides a heat input of 4.0 to 10.0 kJ/mm.

12. The method of production of high strength thick line pipe use welded steel pipe as set forth in claim 8, further comprising heat treating the seam weld zone.

13. The method of production of high strength thick line pipe use welded steel pipe as set forth in claim 12, further comprising heating treating the seam weld zone in a temperature range of 300° to 500° C.

14. The method of production of high strength thick line pipe use welded steel pipe as set forth in claim 8, wherein said base material steel plate further comprises, by mass %, one or both of Cu: 0.05 to 1.50% and Ni: 0.05 to 5.00%.

15. The method of production of high strength thick line pipe use welded steel pipe as set forth in claim 8, wherein said base material steel plate further comprises, by mass %, one or more of Cr: 0.02 to 1.50%, V: 0.010 to 0.100%, Nb: 0.001 to 0.200%, Zr: 0.0001 to 0.0500%, and Ta: 0.0001 to 0.0500%.

16. The method of production of high strength thick line pipe use welded steel pipe as set forth in claim 8, wherein said base material steel plate further comprises, by mass %, one or more of Mg: 0.0001 to 0.0100%, Ca: 0.0001 to 0.0050%, REM: 0.0001 to 0.0050%, Y: 0.0001 to 0.0050%, Hf: 0.0001 to 0.0050%, Re: 0.0001 to 0.0050%, and W: 0.01 to 0.50%.

* * * * *